(12) United States Patent
Wenzel et al.

(10) Patent No.: US 10,029,211 B2
(45) Date of Patent: Jul. 24, 2018

(54) METHOD FOR THE REGENERATION OF A MEMBRANE WALL IN A DISTILLATION DEVICE

(71) Applicant: WATER TECHNOLOGIES GmbH, Grafing (DE)

(72) Inventors: Markus Wenzel, Unterhaching (DE); Sebastian Büttner, München (DE); Dominik Weisz, München (DE); Wolfgang Heinzl, Ramerberg (DE)

(73) Assignee: Major Bravo Limited, Tortola (VG)

( * ) Notice: Subject to any disclaimer, the term of this patent is extended or adjusted under 35 U.S.C. 154(b) by 0 days.

(21) Appl. No.: 15/329,606

(22) PCT Filed: Jul. 29, 2015

(86) PCT No.: PCT/EP2015/067374
§ 371 (c)(1),
(2) Date: Jan. 27, 2017

(87) PCT Pub. No.: WO2016/016301
PCT Pub. Date: Feb. 4, 2016

(65) Prior Publication Data
US 2017/0232391 A1 Aug. 17, 2017

(30) Foreign Application Priority Data
Jul. 29, 2014 (DE) .................. 10 2014 110 746

(51) Int. Cl.
*B01D 61/36* (2006.01)
*B01D 65/02* (2006.01)

(52) U.S. Cl.
CPC ......... *B01D 61/368* (2013.01); *B01D 61/364* (2013.01); *B01D 65/02* (2013.01);
(Continued)

(58) Field of Classification Search
CPC .... B01D 61/368; B01D 61/364; B01D 65/02; B01D 2321/26; B01D 2321/32; B01D 2321/40
See application file for complete search history.

(56) References Cited

U.S. PATENT DOCUMENTS 5,354,474 A * 10/1994 LaPack .................. B01D 53/22
210/637
6,349,835 B1  2/2002 Saux et al.
(Continued)

FOREIGN PATENT DOCUMENTS

CN    102101019    6/2011
DE    102013220199    4/2015
(Continued)

OTHER PUBLICATIONS

PCT/EP2015/067374; PCT International Search Report and Written Opinion of the International Searching Authority dated Sep. 28, 2015.
(Continued)

*Primary Examiner* — David C Mellon
(74) *Attorney, Agent, or Firm* — Renner, Otto, Boisselle & Sklar, LLP

(57) ABSTRACT

A process for the regeneration of a membrane wall in a distillation apparatus, wherein a distillation apparatus having one or more evaporation and condensation stages is provided, each evaporation and condensation stage having at least one flow channel conducting a liquid, said flow channel being at least partially confined by a vapor-permeable and liquid-impermeable membrane wall, wherein vapor emerging from the liquid passes through the membrane wall. The liquid is removed from the at least one flow channel, wherein, after the removal of the liquid, the membrane wall is surrounded on both sides by a gas atmosphere, but is still wetted with liquid, and this liquid is removed by adjusting
(Continued)

the gas atmosphere surrounding the membrane wall such that the partial pressure of the liquid in the gas atmosphere is lower than the vapor pressure of the liquid wetting the membrane wall.

17 Claims, 4 Drawing Sheets

(52) U.S. Cl.
CPC ...... *B01D 2321/26* (2013.01); *B01D 2321/32* (2013.01); *B01D 2321/40* (2013.01)

(56) References Cited

U.S. PATENT DOCUMENTS

| | | | | |
|---|---|---|---|---|
| 2005/0121304 | A1* | 6/2005 | Beckman | B01D 1/22 203/2 |
| 2007/0284306 | A1* | 12/2007 | Cao | B01D 3/065 210/640 |
| 2012/0048803 | A1 | 3/2012 | Shapiro | |
| 2014/0319056 | A1* | 10/2014 | Fuchigami | C02F 1/445 210/648 |

FOREIGN PATENT DOCUMENTS

| | | |
|---|---|---|
| JP | 05192543 | 8/1993 |
| JP | 06277468 | 10/1994 |
| WO | 2013037088 | 3/2013 |

OTHER PUBLICATIONS

PCT/EP2015/067374; PCT International Preliminary Report on Patentability dated Jul. 1, 2016.
Office Action for corresponding German Application No. 102014110746.2 dated May 7, 2015 and its English translation.
Gryta, M.: Long-term performance of membrane distillation process. In: J. Membr. Sci., Bd. 265, 2005, Nr. 1-2, S. 153-159.
Gryta, M.: Direct Contact Membrane Distillation with Crystallization Applied to NaCl Solutions. In: Chem. Pap., Bd. 56, 2002, Nr. 1, S. 14-19.
Gryta, M.: Influence of polypropylene membrane surface porosity on the performance of membrane distillation process. J. Membr. Sci., 287, 2007, 67-78.
Gryta, M.: The influence of polypropylene degradation on the membrane wettability during membrane distillation. In: J. Membr. Sci., Bd. 326, 2009, Nr. 2, S. 493-502.

* cited by examiner

METHOD FOR THE REGENERATION OF A MEMBRANE WALL IN A DISTILLATION DEVICE

The present application is a U.S. National Stage Application based on and claiming benefit and priority under 35 U.S.C. § 371 of International Application No. PCT/EP2015/067374, filed 29 Jul. 2015, which in turn claims benefit of and priority to German Application No. 10 2014 110 746.2 filed 29 Jul. 2014, the entirety of both of which is hereby incorporated herein by reference.

TECHNICAL FIELD

The present invention relates to a process for the regeneration of a membrane wall in a distillation apparatus.

BACKGROUND

A membrane is a thin structure which is permeable to some substances or phases and which is impermeable for other substances or phases. A membrane can be used for material separation. In membrane distillation, a thin, microporous and hydrophobic structure is used as a membrane wall which is permeable to gases, but impermeable to liquids, particularly to water. The thin microporous and hydrophobic structure may be applied to a support layer to enhance the mechanical strength of the membrane wall. In membrane distillation, a liquid flows along the membrane wall, wherein the low-boiling components of the liquid evaporate via the membrane wall due to a differential partial pressure. The membrane wall is used for phase separation and allows a very large area of the phase boundary for the evaporation to be generated. The evaporated ingredients are condensed on the opposite side after passing through the membrane wall and can thus be recovered in liquid form and withdrawn from the process.

Within the membrane pores usually gas is present during the membrane distillation. However, it may occur that the membrane wall is wetted and that liquid enters the pores of the membrane wall. In this case, the liquid retention by the membrane wall is no longer ensures and liquid can pass through the membrane wall.

A wetting of the membrane wall can be effected by crystallization of salts on the surface of the membrane wall, by deposition or by surface-active substances which come in direct contact with the membrane wall.

A membrane wetted by a liquid can be replaced individually or together with the entire distillation apparatus. However, this involves considerable effort and is also an uneconomical solution.

SUMMARY

It is therefore the object of the present invention to provide an advantageous process for the regeneration of a membrane wall in a distillation apparatus in which the membrane wall wetted by a liquid can remain in the distillation apparatus during its regeneration.

The process according to the invention serves for the regeneration of a membrane wall in a distillation apparatus. According to the present invention there is provided a distillation apparatus comprising one or more evaporation and condensation stages for this purpose. Each evaporation and condensation stage comprises at least one flow channel conducting a liquid, which is confined at least partially by a vapor-permeable and liquid-impermeable membrane wall. Vapor emerging from the liquid passes through the membrane wall.

In a first step, the liquid is removed from the at least one flow channel, so that the wetted membrane wall is surrounded on both sides by a gas atmosphere after the removal of the liquid from the at least one flow channel. For this purpose, the liquid may be discharged from the at least one flow channel or alternatively it may be vaporized. The liquid wetting the membrane wall is then removed by adjusting the gas atmosphere surrounding the membrane wall in such a manner that the partial pressure of the liquid in the gas atmosphere is lower than the vapor pressure of the liquid wetting the membrane wall.

The membrane wall is preferably not removed from the distillation apparatus, but remains in the distillation apparatus during removal of the liquid wetting the membrane wall. Accordingly, the membrane wall can be regenerated with less effort and more quickly than this is the case with conventional regeneration processes.

In the regeneration, liquid is removed from the membrane wall and the liquid retention of the membrane wall is restored, i.e. the hydrophobicity of the membrane wall is restored and all substances causing a wetting are removed.

There exist various possibilities for adjusting the gas atmosphere surrounding the membrane wall in such a manner that the partial pressure of the liquid in the gas atmosphere is lower than the vapor pressure of the liquid wetting the membrane wall.

According to one embodiment, a negative pressure is generated in the distillation apparatus, and furthermore heat is fed to the distillation apparatus. This results in an evaporation of the liquid wetting the membrane wall, if the partial pressure of the liquid in the gas atmosphere is sufficiently low. The negative pressure can be generated e.g. by means of a vacuum pump.

The heat energy can be fed to the at least one flow channel via a wall which is impermeable to vapor and liquid but is heat-conducting and which confines the at least one flow channel and is disposed opposite to the membrane wall.

A further embodiment provides for guiding an air flow along the membrane wall and/or via the membrane wall for adjusting the gas atmosphere surrounding the membrane wall in such a manner that the partial pressure of the liquid in the gas atmosphere is lower than the vapor pressure of the liquid wetting the membrane wall.

Before the air flow is guided along the membrane wall and/or via the membrane wall, the air flow can still be heated in order to accelerate the evaporation of the liquid wetting the membrane.

In particular, the air flow can be generated by means of a fan and/or a vacuum pump.

Before the liquid is removed from the distillation apparatus, it is advantageous to flush the at least one flow channel with a rinsing liquid in order to remove particularly those substances from the distillation apparatus which have caused a wetting of the membrane wall and can result again in a wetting.

According to an embodiment, the at least one flow channel is separated from a vapor chamber of the respective evaporation and condensation stage by the membrane wall. Furthermore, the vapor chamber is confined by a condensation wall where the vapor emerging from the liquid and passing through the membrane wall is condensed. During the normal distillation operation of the distillation apparatus, liquid flows through the at least one flow channel, which is to be concentrated. A part of this liquid evaporates via the membrane wall and condenses on the condensation wall.

The vacuum pump can be connected to the vapor chamber for generating the negative pressure in the distillation apparatus. In particular, one feed line or a plurality of feed lines to the at least one flow channel can be shut off, through which, for example, the liquid to be concentrated flows in the normal distillation operation of the distillation apparatus. This makes it possible to sufficiently lower the pressure surrounding the membrane wall in order to accomplish an evaporation of the liquid wetting the membrane wall.

The distillation apparatus may be designed so as to comprise several stages and can comprise a plurality of evaporation and condensation stages disposed one after the other. Here, a respective subsequent evaporation and condensation stage with its at least one flow channel conducting the liquid is directly adjacent to the condensation wall of the preceding evaporation and condensation stage. This condensation wall thus separates the vapor chamber of the preceding evaporation and condensation stage from the at least one flow channel conducting the liquid of the subsequent evaporation and condensation stage and allows the energy released during the condensation of the vapor to be transferred to the liquid flowing through the at least one flow channel.

According to an embodiment, the membrane walls of the plurality of evaporation and condensation stages, which are disposed one after the other, are regenerated successively by firstly removing, particularly by firstly discharging, the liquid present in the at least one flow channel of one of the evaporation and condensation stages while the flow channels of the preceding evaporation and condensation stages remain filled with liquid. Then a negative pressure is generated in the evaporation and condensation stage whose at least one flow channel has been discharged from liquid, for regenerating the membrane wall of this evaporation and condensation stage. After completing the regeneration of the membrane wall of this evaporation and condensation stage the liquid present in the at least one flow channel of the preceding evaporation and condensation stage is removed, particularly discharged, while the flow channels of the remaining evaporation and condensation stages remain filled with liquid. Then, a negative pressure is generated in the preceding evaporation and condensation stage for regenerating the membrane wall of the preceding evaporation and condensation stage.

The procedure described above for the successive regeneration of the membrane walls of the evaporation and condensation stages can be continued until the membrane wall of the first evaporation and condensation stage has been regenerated.

The membrane wall, which is regenerated first, can advantageously be the membrane wall of that evaporation and condensation stage that is arranged last in the series of evaporation and condensation stages.

Furthermore, for accelerating the regeneration of the membrane walls thermal energy can be fed to at the least one flow channel of the first evaporation and condensation stage.

According to a further embodiment, the membrane walls of the plurality of the evaporation and condensation stages, which are disposed one after the other, are regenerated simultaneously by removing, particularly by discharging, the liquid present in the flow channels of the evaporation and condensation stages and then introducing an air flow into parallel in the flow channels of the evaporation and condensation stages, which causes an evaporation of the liquid wetting the membrane walls.

As described above, the at least one flow channel may be separated from a vapor chamber of the respective evaporation and condensation stage by the membrane wall. Furthermore, the vapor chamber may be confined by a condensation wall. As an alternative, the vapor chamber may also be confined by a further membrane wall, which separates the vapor chamber from a further flow channel through which a draw solution flows. The draw solution has a low vapor pressure, thereby causing withdrawal of moisture from the vapor chamber via the further membrane wall.

BRIEF DESCRIPTION OF THE DRAWINGS

Hereinafter, the invention will be set forth in more detail with reference to exemplary embodiments and with reference to the drawings. In the drawings.

DETAILED DESCRIPTION

Figure 1:
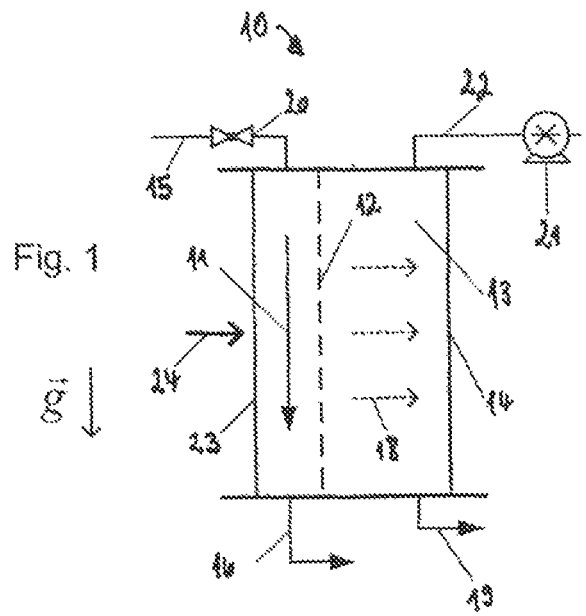
FIG. 1 is a schematic representation of an exemplary embodiment of a distillation apparatus having a flow channel conducting a liquid and having a vapor chamber separated from the flow channel by a membrane wall, the membrane wall being regenerated by means of a negative pressure generated in the distillation apparatus.

FIG. 1 shows, in a schematic side view, an exemplary embodiment of a distillation apparatus 10 having an evaporation and condensation stage, which will be used to set forth an exemplary embodiment of a process for the regeneration of a membrane wall in a distillation apparatus hereinafter. A vector g shows the direction of gravity in FIG. 1 as well as in all further drawings.

The distillation apparatus 10 consists of a flow channel 11 and a vapor chamber 13 separated from the flow channel 11 by a microporous membrane wall 12, which is vapor-permeable but liquid-impermeable. On the side opposite the membrane wall 12, the vapor chamber 13 is confined by a vapor-impermeable and liquid-impermeable condensation wall 14. During the distillation operation, a liquid to be concentrated is fed to the flow channel 11 via a feed line 15. Subsequently, the liquid to be concentrated flows through the flow channel 11 along the direction indicated by an arrow in FIG. 1 and is discharged via an outlet line 16.

In the membrane distillation, part of the liquid to be concentrated is evaporated and re-condensed using thermal energy. In the partial evaporation of the liquid to be concentrated, which may be a mixture of different liquids, may be a solution or may be an emulsion, the respective components evaporate at a given temperature and at a vapor pressure, which is dependent on this temperature, so that individual components can be condensed out. By means of differences in the temperature or in the vapor pressure between the liquid to be concentrated and the vapor chamber 13 vapor is produced at the interface between the liquid to be concentrated and the membrane wall 12, which passes through the membrane wall 12 into the vapor chamber 13 directly adjacent to the membrane wall 12. In the vapor chamber 13, the vapor flows to the condensation wall 14, as indicated by arrows 18 in FIG. 1, and condenses there.

The resulting condensate or distillate at the condensation on the wall 14 caused by the condensation of the vapor trickles downwards along the condensation wall 14 due to gravity. At the bottom of the vapor chamber 13 a condensate outlet 19 is disposed, through which the condensate can be discharged.

In this embodiment, the regeneration of the membrane wall 12, in which wetting substances are removed from the surface and from the pores of the membrane wall 12, is performed as follows.

First, the membrane wall 12 is purged with a rinsing liquid. The rinsing liquid is supplied to the flow channel 11 via the feed line 15 and discharged via the outlet line 16. Here, a part of the wetting substances is already removed from the membrane wall 12. The membrane wall 12 can be flushed or purged with one or more rinsing fluids applied one after the other. Preferably, the rinsing liquid most recently used is clear water or a liquid which can evaporate completely.

After the flushing or purging operation, the liquid is discharged from the flow channel 11. For this purpose, the feed line 15 is closed by means of a shut-off valve 20, and the liquid present in the flow channel 11 is discharged via the outlet line 16, so that the membrane wall 12 is surrounded by a gas atmosphere on both sides, i.e. both on the side adjacent to the flow channel 11 and on the opposite side, which is disposed within the vapor chamber 13.

After the liquid has been discharged from the distillation apparatus 10, the membrane wall 12 is still wetted with liquid at least partly. In the following process step, this liquid is removed from the membrane wall 12. For this purpose, the gas atmosphere surrounding the membrane wall 12 is adjusted in such a manner that the partial pressure of the liquid in the gas atmosphere is lower than the saturation vapor pressure of the liquid wetting the membrane wall 12.

In the embodiment described here, a negative pressure, in particular a vacuum, relative to the ambient pressure prevailing outside of the distillation apparatus 10 is generated in the distillation apparatus 10 by a vacuum pump 21 which is connected to a vent line 22 of the vapor chamber 13. The negative pressure in the distillation apparatus 10 is adjusted in such a manner that the pressure present in the flow channel 11 and in the vapor chamber 13 is lower than the vapor pressure of the liquid remaining in the flow channel 11. Thereby, the remaining liquid in the flow channel 11 begins to evaporate on the surface and in the pores of the membrane wall 12, whereby the membrane wall 12 is dried and regenerated.

The vapor generated in the distillation apparatus 10 by the negative pressure may be extracted by the vacuum pump 21 or may be condensed on the cooled condensation wall 14 in the vapor chamber 13 and may be discharged via the condensate outlet 19.

The drying of the membrane wall 12 starts as soon as the partial pressure in the gas atmosphere is lower than the saturation vapor pressure of the liquid in the membrane wall 12. During the drying process, the pressure in the vapor chamber 13 adjacent to the membrane wall 12 drops because the liquid is cooled on the membrane wall 12. The pressure in the vapor chamber 13 can be measured and it can be determined that the drying process is completed, if the pressure in the vapor chamber 13 no longer changes.

The drying of the membrane wall 12 can be accelerated by supplying heat to the flow channel 13 via a wall 23, which is disposed in the flow channel 11 opposite to the membrane wall 12.

The wall 23 is impermeable to vapor and liquid, but is thermally conductive and can, in particular, consist of the same material as the condensation wall 14. The heat supply is indicated in FIG. 1 by an arrow 24. The heat can be supplied, for example, by condensing a vapor on the wall 23 or by contacting the wall 23 with a warm flow of fluid or gas.

It should be noted that the membrane wall 12 is not removed from the distillation apparatus 10 for carrying out the regeneration process. Rather, the membrane wall 12 remains in the distillation apparatus 10 during the entire regeneration process.

It is also possible for the liquid not to be discharged via the outlet line 16 after the flushing operation, but that the shut-off valve 20 is closed and the liquid remains in the flow channel 11. In this case, the liquid present in the flow channel 11 is evaporated completely during the drying process. This procedure is particularly advantageous when there is no suitable outlet line 16.

Figure 2:
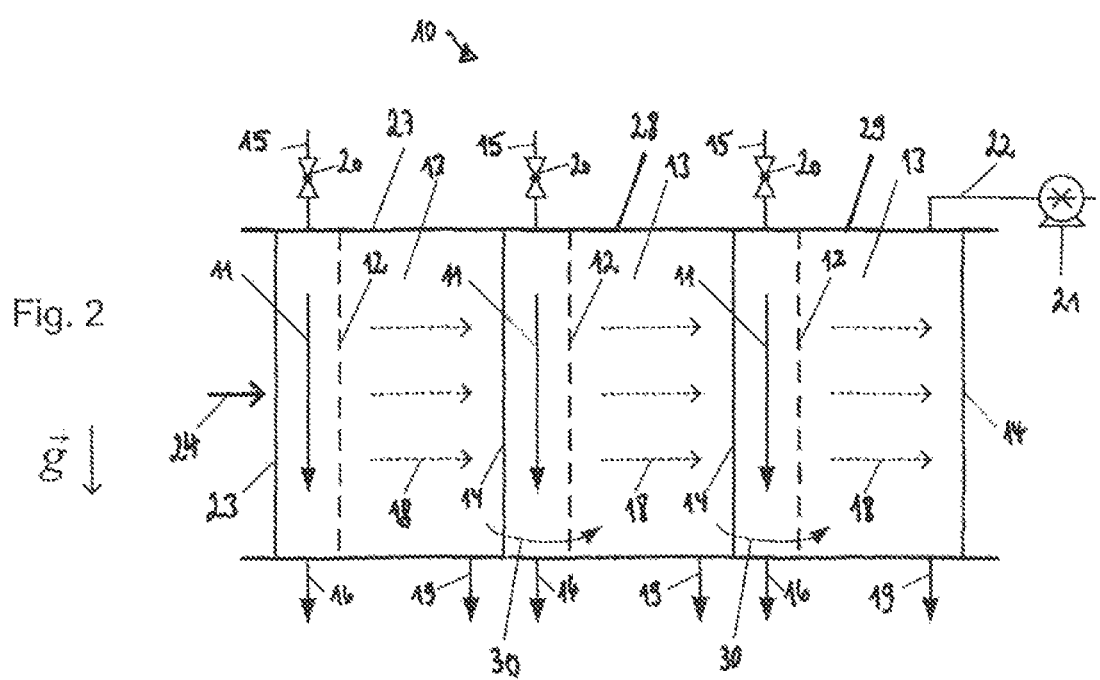
FIG. 2 is a schematic representation of an exemplary embodiment of a distillation apparatus having a plurality of evaporation and condensation stages disposed one after the other, the membrane walls of the evaporation and condensation stages being regenerated successively by means of a negative pressure generated in the distillation apparatus.

FIG. 2 shows, in a schematic side view, an exemplary embodiment of a distillation apparatus 10 having a first evaporation and condensation stage 27, a second evaporation and condensation stage 28 and a third evaporation and condensation stage 29.

Each of the evaporation and condensation stages 27 to 29 has the same structure as the evaporation and condensation stage shown in FIG. 1. Accordingly, each of the evaporation and condensation stages 27 to 29 comprises a flow channel 11, a vapor chamber 13, a membrane wall 12 separating the flow channel 11 from the vapor chamber 13 and a condensation wall 14.

The second evaporation and condensation stage 28 directly adjoins the condensation wall 14 of the first evaporation and condensation stage 27 by means of its flow channel 11, which conducts the liquid. This condensation wall 14 thus separates the vapor chamber 13 of the first evaporation and condensation stage 27 from of the second evaporation and condensation stage 28 conducting the liquid. During the distillation operation, the energy released during the condensation of the vapor at the condensation wall 14 is transferred to the liquid to be concentrated flowing through the adjacent flow channel 11.

Likewise, the flow channel 11 of the third evaporation and condensation stage 29 directly adjoins the condensation wall 14 of the second evaporation and condensation stage 28. During the distillation operation, the energy released at the condensation wall 14 of the second evaporation and condensation stage 28 during the condensation of the vapor is therefore transferred to the liquid to be concentrated flowing through the flow channel 11 of the third evaporation and condensation stage 29.

The condensation walls 14 respectively disposed on the left-hand side of the second and third evaporation and condensation stages 28, 29 correspond to the wall 23 of the first evaporation and condensation stage 27.

Furthermore, the vapor chambers 13 of respectively adjacent evaporation and condensation stages 27 to 29 are connected to one another via a respective pressure compensation channel 30. The vacuum pump 21 is connected to the vapor chamber 13 of the third evaporation and condensation stage 29 via the vent line 22.

Although not shown in FIG. 2, the flow channels 11 of the evaporation and condensation stages 27 to 29, which conduct the liquid to be concentrated, can be connected in series. For this purpose, the outlet line 16 of the flow channel 11 of the first evaporation and condensation stage 27 is connected to the feed line 15 of the flow channel 11 of the second evaporation and condensation stage 28 and the outlet line 16 of the flow channel 11 of the second evaporation and condensation stage 28 is connected to the feed line 15 of the flow channel 11 of the third evaporation and condensation stage 29.

Instead of the three evaporation and condensation stages 27 to 29 shown in FIG. 2, two or more than three evaporation and condensation stages may also be provided, which are connected to one another in the same manner as in FIG. 2.

As a result of arranging the evaporation and condensation stages 27 to 29 one after the other, the vapor generated in a respective evaporation and condensation stage serves for heating the liquid to be concentrated in the respectively subsequent evaporation and condensation stage, because the thermal energy released during the condensation of the vapor on the condensation wall 14 is transferred to the liquid flowing through the adjacent flow channel 11 via the condensation wall 14.

The regeneration of the membrane walls 12 of the evaporation and condensation stages 27 to 29 is performed as follows.

First, the flow channels 11 of all evaporation and condensation stages 27 to 29 are purged with a rinsing liquid, in particular water. If the flow channels 11 of the evaporation and condensation stages 27 to 29 are connected to one another in series, the rinsing liquid can be conducted successively through the flow channels 11.

After purging of the flow channels 11, the flow of the rinsing fluid through the flow channels 11 is stopped and the shut-off valve 20 of the third evaporation and condensation stage 29, i.e. of the last evaporation and condensation stage in the direction of flow of the vapor, is closed and only the flow channel 11 of the third evaporation and condensation stage 29 is discharged. Accordingly, the membrane wall 12 of the third evaporation and condensation stage 29 is surrounded on both sides by a gas atmosphere. The liquid continues to flow through the channels 11 of the first and second evaporation and condensation stages 27, 28 or fills them.

By means of the vacuum pump 21 connected to the vent line 22 of the vapor chamber 13 of the third condensation and evaporation stage 29, the negative pressure in the third condensation and evaporation stage 29 can be adjusted in such a manner that the liquid wetting the membrane wall 12 of the third evaporation and condensation stage 29 evaporates. The resulting vapor condenses either on the condensation wall 14 of the third condensation and evaporation stage 29 or flows out of the distillation apparatus 10 via the vacuum pump 21.

Because the rinsing fluid still flows through the flow channels of the two other condensation and evaporation stages 27, 28 or liquid is at least still present in these flow channels during the drying of the membrane wall 13 of the third condensation and evaporation stage 29, the discharged flow channel 11 of the third condensation and evaporation stage 29 continues to be heated by the incoming vapor of the upstream condensation and evaporation stages 27, 28 or by the heat transferred to the first condensation and evaporation stage 27 via the wall 23 (cf. arrow 24), whereby the drying process of the membrane wall 12 of the third condensation and evaporation stage 29 is accelerated.

As soon as the membrane wall 12 of the third condensation and evaporation stage 29 has dried, drying of the membrane wall 12 of the second condensation and evaporation stage 28 is continued. For this purpose, the shut-off valve 20 of the second condensation and evaporation stage 28 is closed and the associated flow channel 11 is discharged. Since the vapor chamber 13 of the second condensation and evaporation stage 28 is connected to the vapor chamber 13 of the third condensation and evaporation stage 29 via the pressure compensation channel 30, the pressure generated by the vacuum pump is generated on both sides of the membrane wall 13 of the second condensation and evaporation stage 28 and the membrane wall 12 of the second condensation and evaporation stage 28 is dried.

Since during the drying of the membrane wall 13 of the second condensation and evaporation stage 28 the rinsing liquid continues to flow through the flow channel 11 of the first condensation and evaporation stage 27 or at least fills this flow channel with liquid, heat is transferred to the flow channel 11 of the second condensation and evaporation stage 28, whereby the drying of the membrane wall 12 of the second condensation and evaporation stage 28 is accelerated.

As soon as the membrane wall 12 of the second condensation and evaporation stage 28 has dried, the flow channel 11 of the first condensation and evaporation stage 27 is finally discharged and the associated membrane wall 12 is dried by generating the pressure by means of the vacuum pump 21 on both sides of the membrane wall 12, which pressure is necessary for the evaporation of the liquid wetting the membrane wall 12. In order to accelerate the drying process, heat is fed to the flow channel 11 of the first condensation and evaporation stage 27 from the outside (see arrow 24).

Figure 3:
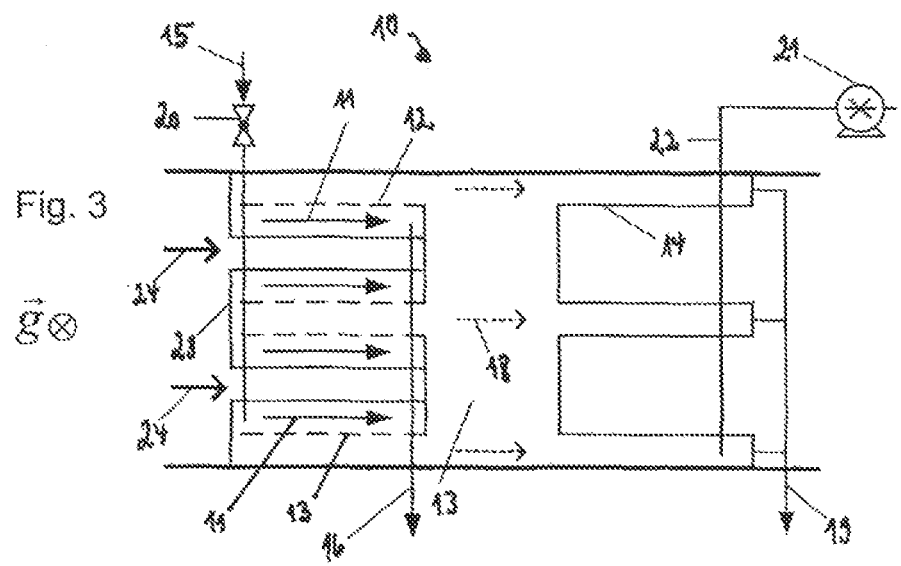
FIG. 3 is a schematic representation of an exemplary embodiment of a distillation apparatus having a plurality of parallel flow channels, the membrane walls being regenerated by means of a negative pressure generated in the distillation apparatus.

FIG. 3 shows, in a schematic plan view, an exemplary embodiment of a distillation apparatus 10 as a further refinement of the distillation apparatus shown in FIG. 1. The distillation apparatus 10 of FIG. 3 comprises a plurality of mutually parallel flow channels 11 conducting the liquid to be concentrated, which are each separated from the same vapor chamber 13 by a vapor-permeable but liquid-impermeable membrane wall 12. The flow channels 11 are fed by the same feed line 15.

In FIG. 3, the condensation wall 14 is also configured such that it projects at several locations into the vapor chamber 13 in order to increase the total surface available for the condensation of the vapor.

The regeneration of the membrane wall 12 is performed in the same manner as in the distillation apparatus 10 shown in FIG. 1. Accordingly, the membrane walls 12 are first purged by a rinsing liquid. After the purging operation, the rinsing liquid is discharged from the flow channels 11 by closing the shut-off valve 20. After discharging the rinsing liquid from the distillation apparatus 10, a negative pressure can be generated on both sides of the respective membrane wall 12 by means of the vacuum pump 21, which causes an evaporation of the liquid wetting the membrane walls 12. Furthermore, the drying of the membrane walls 12 can be accelerated by supplying heat to the flow channels 13 through the material-impermeable but heat-conductive wall 23.

Figure 4:
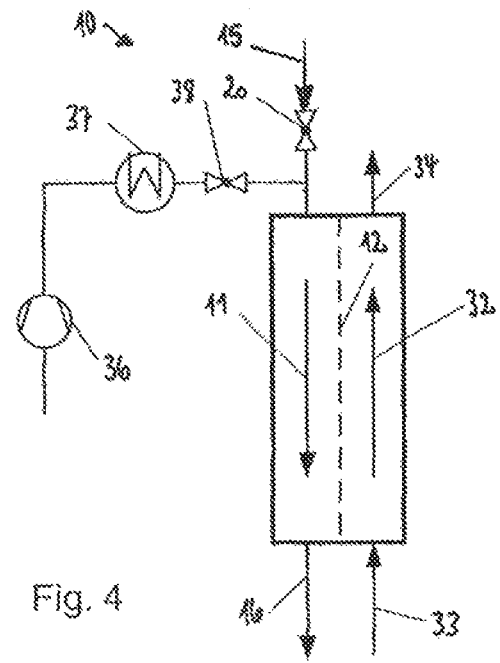
FIG. 4 is a schematic representation of an exemplary embodiment of a distillation apparatus, the membrane wall being regenerated by means of an air flow generated by a fan.

FIG. 4 shows, in a schematic side view, an exemplary embodiment of a distillation apparatus 10, which is designed as a direct contact membrane distillation apparatus (DCMD).

The distillation apparatus 10 consists of a flow channel 11 through which a liquid to be concentrated flows, of a flow channel 32 through which a liquid to be diluted flows and of a membrane wall 12, which separates the two flow channels 11, 32 and which is microporous and vapor-permeable, but liquid-impermeable.

During the distillation operation, the liquid to be concentrated is supplied to the flow channel 11 via a feed line 15, which can be closed by means of a shut-off valve 20. The liquid to be concentrated passes through the flow channel 11 along the direction indicated in FIG. 4 by an arrow and is discharged via an outlet line 16.

The liquid to be diluted is fed to the flow channel 32 via a feed line 33 and discharged via an outlet line 34. The liquid to be diluted passes through the distillation apparatus in the opposite direction as the liquid to be concentrated.

In the direct contact membrane distillation applied here, a part of the liquid to be concentrated evaporates in the flow channel 11 and passes through the membrane wall 12 into the flow channel 32, where the vapor condenses to the liquid to be diluted.

For regeneration of the membrane wall 12, the two flow channels 11, 32 are initially purged with a rinsing liquid and then discharged via the outlet lines 16, 34. Thereafter, a dry air flow is introduced into the flow channel 11 via the feed line 15.

The air flow is generated by a blower 36 and may optionally be heated by means of an air heater 37 disposed upstream or downstream of the blower 36. Furthermore, a shut-off valve 38 is provided so that the blower 36 and the air heater can be disconnected from the flow channel 11 during normal operation of the distillation apparatus 10 for direct contact membrane distillation.

The air flow dries the membrane wall 12 and the fluid channels 11, 32 and may flow out of the distillation apparatus 10 via one discharge line 16, 34 or via both discharge lines 16, 34, wherein the air may flow within the distillation apparatus 10 along and/or through the membrane wall 12.

The drying of the membrane wall 12 and of the fluid channels 11, 32 can be accelerated by heating the air flow by means of the air heater 37.

The drying process can be monitored by measuring the temperature and the water content of the air flowing into the flow channel 11 and of the air flowing out of flow channel 11. The drying process is completed as soon as the incoming and outcoming air has the same temperature and the same water content.

Figure 5:
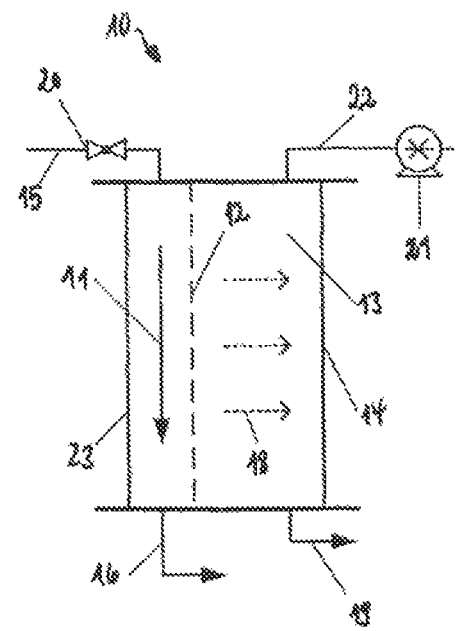
FIG. 5 is a schematic representation of an exemplary embodiment of a distillation apparatus, the membrane wall being regenerated by means of an air flow generated by a vacuum pump.

FIG. 5 shows a schematic side view of an exemplary embodiment of a distillation apparatus 10, which is nearly identical in construction to the distillation apparatus 10 of FIG. 1.

For the regeneration of the membrane wall 12 of the distillation apparatus 10 of FIG. 5, the shut-off valve 20 is opened after purging and discharging of the flow channel 11, unlike in the embodiment above explained with reference to FIG. 1. Further, a slight negative pressure is generated by means of the vacuum pump 21 in the housing of the distillation apparatus 10, which enables dry ambient air to flow into the flow channel 11 via the feed line 15. The incoming air flows through the membrane wall 12 and causes evaporation of liquid wetting the membrane wall 12. The intake air flow is conducted out of the distillation apparatus 10 by the vacuum pump 21.

Figure 6:
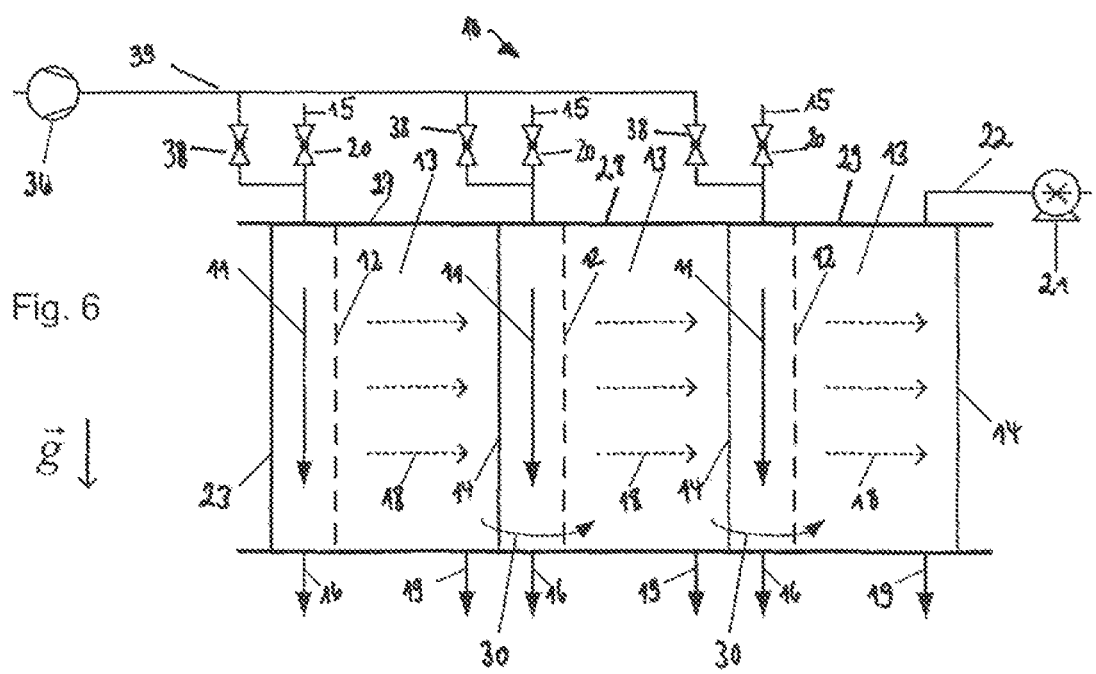
FIG. 6 is a schematic representation of an exemplary embodiment of a distillation apparatus having a plurality of evaporation and condensation stages disposed one after the other, the membrane walls of the evaporation and condensation stages being regenerated by means of an air flow introduced in parallel into the flow channels of the evaporation and condensation stages.

FIG. 6 shows a schematic side view of an exemplary embodiment of a distillation apparatus 10, which is nearly identical in construction to the distillation apparatus 10 of FIG. 2.

In contrast to the distillation apparatus of FIG. 2, however, a blower 36 is provided in FIG. 6, which is connected to the feed lines 15 of the evaporation and condensation stages 27 to 29 via an air line 39. Each of the feed lines 15 can be disconnected from the blower 36 by means of a shut-off valve 38 as required.

The regeneration of the membrane walls 12 of the evaporation and condensation stages 27 to 29 is performed as follows. After purging the flow channels 11 with the rinsing liquid all flow channels 11 of the distillation apparatus 10 are discharged, so that the membrane walls 12 of the evaporation and condensation stages 27 to 29 are each surrounded on both sides by a gas atmosphere.

Subsequently, the shut-off valves 38 are opened, and dry air is introduced simultaneously into all flow channels 11 of the evaporation and condensation stages 27 to 29 or specifically into individual ones of the flow channels 11 of the evaporation and condensation stages 27 to 29 by means of the blower 36, whereby the membrane walls 12 are dried. Optionally, the air flowing into the flow channels 11 can by heated by an air heater.

Figure 7:
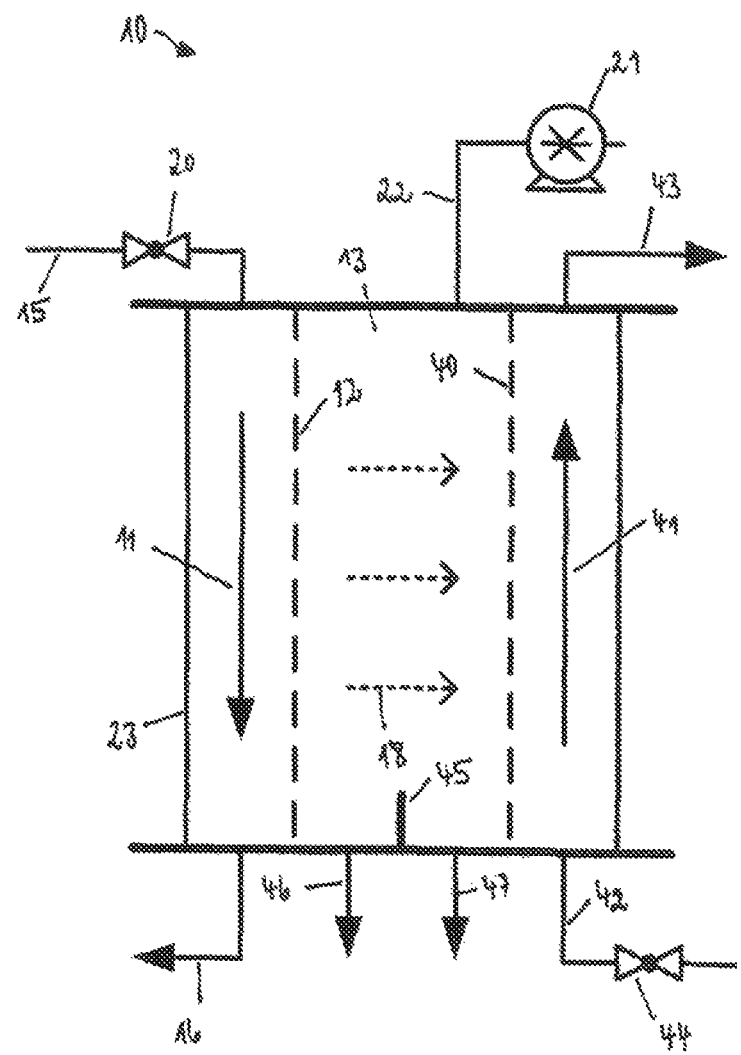
FIG. 7 is a schematic representation of an exemplary embodiment of a distillation apparatus having a vapor chamber, which is separated from a further flow channel by a further membrane wall, wherein a draw solution flows through the further flow channel.

FIG. 7 shows a schematic side view of an exemplary embodiment of a distillation apparatus 10, which is nearly identical in construction to the distillation apparatus 10 of FIG. 1. In contrast to the distillation apparatus 10 of FIG. 1, however, in FIG. 7 the vapor chamber 13 is not confined by a condensation wall 14 which is vapor-impermeable and liquid-impermeable, but a micro-porous, vapor-permeable, but liquid-impermeable membrane wall 40 separates the vapor chamber 13 from a flow channel 41. During the distillation operation and the drying of the membrane wall 12, a draw solution flows through the flow channel 41. During the distillation operation, this draw solution has a lower vapor pressure for the substances to be distilled and generates the differential pressure necessary for the distillation. The draw solution is supplied to the flow channel 41 via a feed line 42 and is discharged via an outlet line 43. To shut off the feed line 42 a shut-off valve 44 is provided. The draw solution flows through the flow channel 41 in particular in a direction opposite to the liquid flowing through the flow channel 11. The draw solution has a lower vapor pressure than the liquid wetting the membrane wall 12. For example, a highly-concentrated salt-water solution is suitable as a draw solution when water is wetting the membrane wall 12.

The liquid can be discharged from the flow channel 11 before the drying of the membrane wall 12; alternatively, the liquid may also remain in the flow channel 11 and be evaporated during the drying process. During the drying process the draw solution flows through the flow channel 41 and as a result of its low vapor pressure it causes that moisture is removed from the vapor chamber 13 via the membrane wall 40. Thereby a drying of the membrane wall 12 is effected. The drying process can optionally be supported by the vacuum pump 21. The drying process is completed, if the temperature and/or the concentration of the draw solution does not change anymore.

As shown in FIG. 7, the bottom of the vapor chamber 13 may be divided into two regions by a dam 45, so that a liquid passage of one of the flow channels 11, 41 does not contaminate the respective other flow channel 11, 41. On both sides of the dam 45 outlet lines 46, 47 are provided to discharge the liquid that has passed the membrane walls 12, 40.

LIST OF REFERENCE NUMERALS

10 distillation apparatus
11 flow channel
12 membrane wall
13 vapor chamber
14 condensation wall
15 feed line
16 outlet line
18 arrow
19 condensate outlet
20 shut-off valve
21 vacuum pump
22 vent line
23 wall
24 arrow
27 first evaporation and condensation stage
28 second evaporation and condensation stage
29 third evaporation and condensation stage
30 pressure compensation channel
32 flow channel
33 feed line
34 outlet line
36 air blower
37 air heater
38 shut-off valve
39 air line
40 membrane wall
41 flow channel
42 feed line
43 outlet line
44 shut-off valve
45 dam
46 outlet line
47 outlet line
g direction of gravity

The invention claimed is:

1. A process for the regeneration of a membrane wall in a distillation apparatus, wherein
a distillation apparatus comprising one or more evaporation and condensation stages is provided, wherein each evaporation and condensation stage comprises at least one flow channel conducting a liquid, said one flow channel being confined at least partially by a vapor-permeable and liquid-impermeable membrane wall, wherein a vapor emerging from the liquid passes through the membrane wall and the membrane wall is surrounded on both sides by a gas atmosphere,
wherein
the liquid is removed from the at least one flow channel, but the membrane wall is still wetted by the liquid,
the liquid wetting the membrane wall is removed by adjusting the gas atmosphere surrounding the membrane wall in such a manner that the partial pressure of the liquid in the gas atmosphere is lower than the vapor pressure of the liquid wetting the membrane wall,
a negative pressure is generated in the distillation apparatus, and heat is fed to the distillation apparatus, and the at least one flow channel is further confined by a vapor-impermeable and liquid-impermeable wall, which is disposed opposite to the membrane wall, and that the heat is fed to the distillation apparatus via the vapor-impermeable and liquid-impermeable wall.

2. The process according to claim 1, wherein the negative pressure is generated in the distillation apparatus by a vacuum pump.

3. The process according to claim 2, wherein the vacuum pump is connected to a vapor chamber and one feed line or a plurality of feed lines to the at least one flow channel is shut off, for generating the negative pressure in the distillation apparatus.

4. The process according to claim 3, wherein the distillation apparatus comprises a plurality of evaporation and condensation stages having the same structure disposed one after the other and wherein the at least one flow channel conducting the liquid of a respective subsequent evaporation and condensation stage is directly adjacent to the condensation wall of a preceding evaporation and condensation stage and wherein the condensation wall thus separates the vapor chamber of the preceding evaporation and condensation stage from the at least one flow channel conducting the liquid of a subsequent evaporation and condensation stage.

5. The process according to claim 1, wherein the at least one flow channel is rinsed with a rinsing liquid before the liquid is removed from the at least one flow channel.

6. The process according to claim 5, wherein the at least one flow channel is separated from a vapor chamber of a respective evaporation and condensation stage by the membrane wall and wherein a vapor chamber is confined by a condensation wall where the vapor emerging from the liquid and passing through the membrane wall is condensed.

7. The process according to claim 1, wherein the at least one flow channel is separated from a vapor chamber of a respective evaporation and condensation stage by the membrane wall and wherein a vapor chamber is confined by a condensation wall where the vapor emerging from the liquid and passing through the membrane wall is condensed.

8. The process according to claim 7, wherein the distillation apparatus comprises a plurality of evaporation and condensation stages having the same structure disposed one after the other and wherein the at least one flow channel conducting the liquid of a respective subsequent evaporation and condensation stage is directly adjacent to the condensation wall of the preceding evaporation and condensation stage and wherein the condensation wall thus separates the vapor chamber of the preceding evaporation and condensation stage from the at least one flow channel conducting the liquid of a subsequent evaporation and condensation stage.

9. The process according to claim 8, wherein each membrane wall of the plurality of evaporation and condensation stages are regenerated successively by removing the liquid present in the at least one flow channel of one of the evaporation and condensation stages while the flow channels of the preceding evaporation and condensation stages remain filled with liquid, and by generating a negative pressure in the evaporation and condensation stage with the at least one flow channel being purged from liquid, for regenerating the membrane wall of said evaporation and condensation stage, and that the liquid present in said at least one flow channel of the preceding evaporation and condensation stage is removed after the regeneration of the membrane wall of said evaporation and condensation stage while the flow channels of the remaining evaporation and condensation stages remain filled with liquid, and that subsequently a negative pressure is generated in the preceding evaporation and condensation stage for regenerating the membrane wall of the preceding evaporation and condensation stage.

10. The process according to claim 9, wherein the successive regeneration of the membrane walls of the evaporation and condensation stages is continued until the membrane wall of a first evaporation and condensation stage of the plurality of evaporation and condensation stages has been regenerated.

11. The process according to claim 10, wherein the membrane wall of a last evaporation and condensation stage of the plurality of evaporation and condensation stages is regenerated as the first membrane wall.

12. The process according to claim 11, wherein thermal energy is fed to the at least one flow channel of a first evaporation and condensation stage of the plurality of evaporation and condensation stages during the successive regeneration of the membrane walls of the evaporation and condensation stages.

13. The process according to claim 10, wherein thermal energy is fed to the at least one flow channel of a first evaporation and condensation stage of the plurality of evaporation and condensation stages via the vapor-impermeable and liquid-impermeable wall during the successive regeneration of the membrane walls of the evaporation and condensation stages.

14. The process according to claim 9, wherein the membrane wall of a last evaporation and condensation stage of the plurality of evaporation and condensation stages is regenerated as the first membrane wall.

15. The process according to claim 14, wherein thermal energy is fed to the at least one flow channel of a first evaporation and condensation stage of the plurality of evaporation and condensation stages via the vapor-impermeable and liquid-impermeable wall during the successive regeneration of the membrane walls of the evaporation and condensation stages.

16. The process according to claim 9, wherein thermal energy is fed to the at least one flow channel of a first evaporation and condensation stage of the plurality of evaporation and condensation stages via the vapor-impermeable and liquid-impermeable wall during the successive regeneration of the membrane walls of the evaporation and condensation stages.

17. The process according to claim 1, wherein the membrane wall remains in the distillation apparatus during the removal of the liquid wetting the membrane wall.

* * * * *